(12) United States Patent
Ishida et al.

(10) Patent No.: US 8,060,241 B2
(45) Date of Patent: Nov. 15, 2011

(54) AUTOMATIC WAREHOUSE

(75) Inventors: Masato Ishida, Kyoto (JP); Yoshinori Mitta, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1201 days.

(21) Appl. No.: 11/792,044

(22) PCT Filed: Dec. 1, 2005

(86) PCT No.: PCT/JP2005/022073
§ 371 (c)(1),
(2), (4) Date: Jun. 1, 2007

(87) PCT Pub. No.: WO2006/059676
PCT Pub. Date: Jun. 8, 2006

(65) Prior Publication Data
US 2008/0118335 A1    May 22, 2008

(30) Foreign Application Priority Data

Dec. 2, 2004  (JP) .................................. 2004-350201

(51) Int. Cl.
*G06F 7/00* (2006.01)
*G06F 17/00* (2006.01)
*B65G 1/00* (2006.01)

(52) U.S. Cl. ........ 700/215; 700/214; 700/216; 700/229; 700/231; 414/286

(58) Field of Classification Search .................. None
See application file for complete search history.

(56) References Cited

FOREIGN PATENT DOCUMENTS

| JP | 2-311979 A | 12/1990 |
|----|------------|---------|
| JP | 2002-264060 A | 9/2002 |
| JP | 2002264060 A * | 9/2002 |

OTHER PUBLICATIONS

International Search Report of PCT/JP2005/022073, date of mailing Feb. 14, 2006.

* cited by examiner

*Primary Examiner* — Gene Crawford
*Assistant Examiner* — Yolanda Cumbess
(74) *Attorney, Agent, or Firm* — Westerman, Hattori, Daniels & Adrian, LLP (57) ABSTRACT

Stations (8,9) of an automatic warehouse (2) are provided with transfer devices (10) for transferring an article one by one between a tray and a bucket, and hands (11, 12) of the transfer devices are provided with an ID tag reader and writer. The ID of the article stored in the bucket can be grasped and delivering products can be inspected, and further, data corresponding to each article can be written in the ID tag.

8 Claims, 6 Drawing Sheets

| Manufacturer code | Model number | Unique ID | Option |
|---|---|---|---|

AUTOMATIC WAREHOUSE

TECHNICAL FIELD

The present invention relates to an automatic warehouse.

BACKGROUND ART

Patent Publication 1 discloses a technique of reading data of ID tags when shipment of articles arrives, for automatically inspecting the articles. However, Patent Publication 1 does not study application of the ID tags in an automated warehouse, in particular, management of IDs of articles stored in carriers such as buckets, pallets, and trays. Further, Patent Publication 1 does not study any technique of writing data of individual articles to the articles when the articles are taken out of the carriers.

Patent Publication 1: Japanese Laid-Open Patent Publication No. 2002-104632

DISCLOSURE OF THE INVENTION

Problems to be Solved by the Invention

An object of the present invention is to make it possible to obtain data of IDs of individual articles stored in carriers, or taken out of the carriers, and manage the data.

Means for Solving the Problems

According to the present invention, an automatic warehouse comprises a carrier for storing a plurality of articles and a transfer device having a hand for holding articles and transferring the articles to and from the carrier one by one for storage of articles in, and retrieval of articles from the warehouse. An ID reader is attached to the hand for reading ID tags of the articles.

Preferably, the ID reader is an ID reader-writer.

Further, preferably, means for taking an image of articles to be stored in the warehouse is provided to determine the positions of the articles. The hand is controlled in accordance with the determined positions, for transferring the articles to the carrier. Further, means for storing the positions in the carrier where the articles to be stored in the warehouse are placed by the hand, and data of the read ID tags is provided.

Further, according to the present invention, an automatic warehouse comprises a carrier for storing a plurality of articles and a transfer device having a hand for holding articles and transferring the articles to and from the carrier one by one for storage of the articles in, and retrieval of the articles from the warehouse. An ID writer is attached to the hand, for writing data in ID tags of the articles.

Advantages of the Invention

According to the present invention, the hand for transferring articles one by one has the ID reader. Therefore, it is possible to manage the correspondence between the IDs and positions of the articles stored in the carrier. Further, at the time of retrieving articles from a warehouse, it is possible to manage individual IDs of articles retrieved from the warehouse one by one. Further, since the ID reader is attached to the hand for holding and transferring the article one by one, the ID reader can only read data of the ID tag of the article held by the hand, and data of the ID tags of the other articles is not read erroneously.

Preferably, the hand for holding and transferring articles to, or retrieving the articles from the carrier one by one has the ID reader-writer. For example, if the hand is used at the time of storage of articles in the warehouse, it is possible to read ID data of the individual articles, and write data of individual articles, if any. Further, if the hand is used at the time of retrieval of articles from the warehouse, it is possible to inspect the articles retrieved from the warehouse, and write data of individual articles.

Further, preferably, by controlling the hand in accordance with the positions determined by taking an image of the articles to be stored in the warehouse, the articles are transferred to the carrier. Further, the positions in the carrier where the articles to be stored in the warehouse, and data of the read ID tags are stored. Thus, the hand can reliably transfer the articles to the carrier, and it is possible to manage the correspondence between the positions and IDs of articles in the carrier.

Further, according to the present invention, it is possible to write suitable data in the ID tag of each of individual articles. For example, for the article, it is possible to write data such as the best-before date, the destination, the wholesale price, the next transportation destination or the like. Distribution management can be performed easily for the articles one by one. Also in this case, since the hand for transferring the articles one by one has the ID writer, ID tags of other articles are not written by confusion.

DESCRIPTION OF THE NUMERALS

2: automatic warehouse
4: rack
5: stacker crane
6: elevation frame
7: ID reader
8: storage station
9: retrieval station
10: transfer device
11, 12: hand
13, 14: camera
16: long distance conveyor
17: sorter
20: computer
22: ID reader
23: ID reader-writer
24: frame
26: arm 28: conveyor
29: lifter
30: bucket
32: tray
34: article
36, 37: ID tag
40: image recognition unit
42: article data calculation unit

BEST MODE FOR CARRYING OUT THE INVENTION

Hereinafter, an embodiment in the most preferred form for carrying out the present invention will be described.

EMBODIMENT

FIGS. 1 to 7 shows the embodiment. In the drawings, a reference numeral 2 denotes an automatic warehouse, reference numerals 4 denote a pair of left and right racks, a reference numeral 5 denotes a stacker crane, and a reference numeral 6 denotes an elevation frame of the stacker crane 5. For example, the elevation frame 6 has an ID reader 7 for reading data of ID tags of carriers such as buckets, pallets, and trays.

Figure 1:
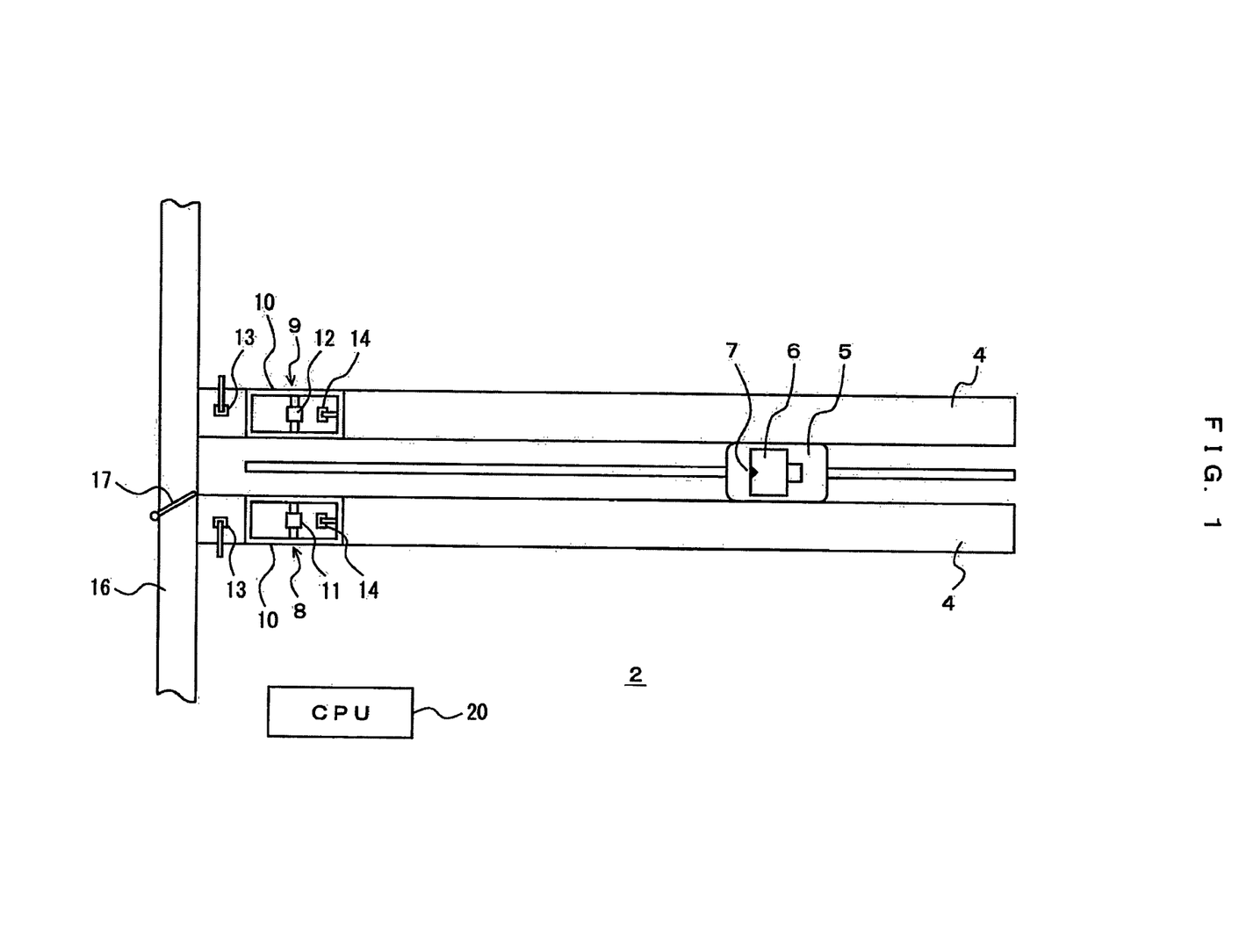
FIG. 1 is a plan view schematically showing a layout of an automatic warehouse according to an embodiment.

A reference numeral 8 denotes a storage station, and a reference numeral 9 denotes a retrieval station. Each of the stations 8, 9 has a transfer device 10 for transferring articles one by one between external carriers such as trays and carriers in the automatic warehouses 2 such as buckets. Reference numerals 11 and 12 denote hands for holding, and moving the articles one by one by sucking or chucking. The difference between the hands 11 and 12 is in that the hand 11 of the storage station 8 has an ID reader, and the hand 12 of the retrieval station 9 has an ID reader-writer. The hands 11 and 12 are the same in the other respects. Operation of transferring the article, placing the article into the carrier, or taking the article out of the carrier is also referred to as picking. Reference numerals 13 and 14 denote cameras such as CCD cameras. The camera 13 takes an image of articles on the tray, and the camera 14 takes an image of articles on the bucket. These images are used to determine positions of picking articles by the hands 11 and 12, and position of unloading articles from the hands 11 and 12. A reference numeral 16 denotes a long distance conveyor for transporting trays or the like. A reference numeral 17 denotes a sorter. A reference numeral 20 denotes a computer for controlling the stations 8 and 9 in the automatic warehouse 2, controlling the stacker crane 5, and managing the inventory in the automatic warehouse. The long distance conveyor 16 and the sorter 17 are not regarded as part of the automatic warehouse 2, and are managed by other computers.

Figure 2:
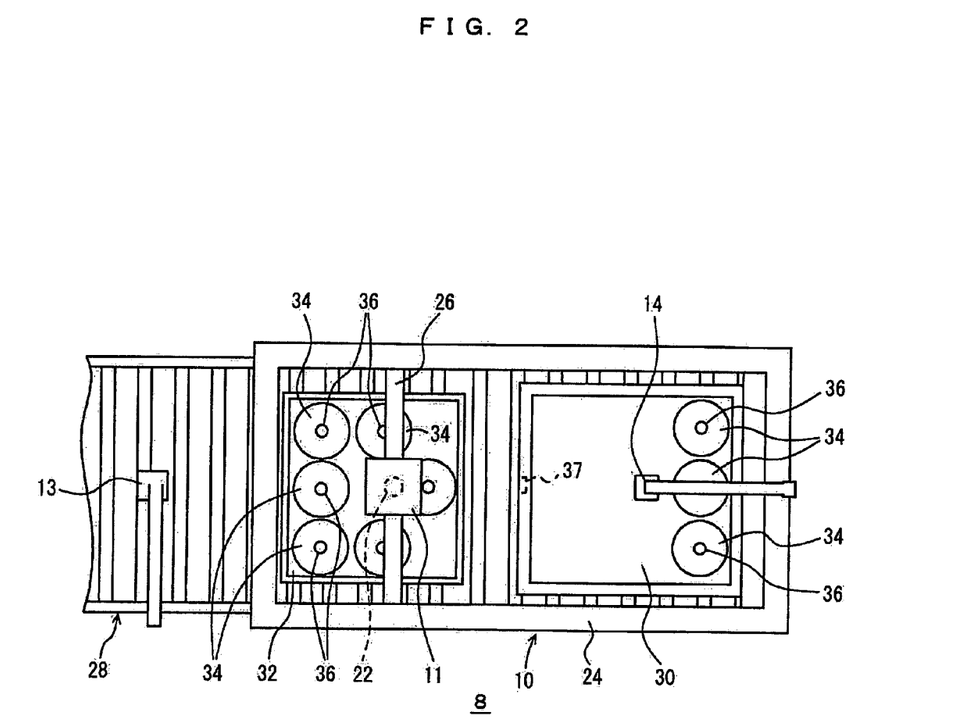
FIG. 2 is a plan view showing a station in the automatic warehouse according to the embodiment.
Figure 3:
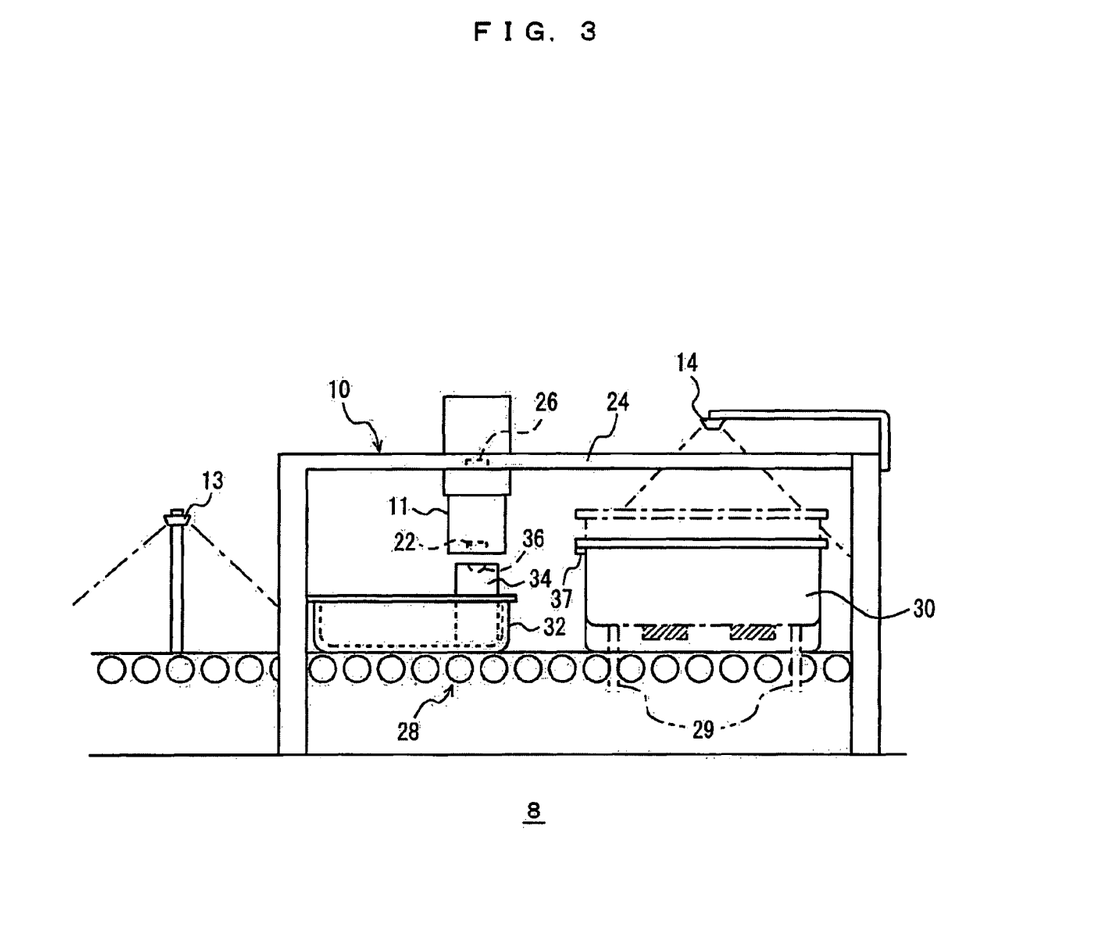
FIG. 3 is a side view showing the station in the automatic warehouse according to the embodiment.

FIGS. 2 and 3 show structure of the storage station 8. A reference numeral 24 denotes a suitable frame for allowing an arm 26 to move in a longitudinal direction (X direction) of the frame 24, and the hand 11 moves in a Y direction along the arm 26. The hand 11 can be elevated/lowered by an air cylinder or the like. The hand 11 holds articles 34 one by one by sucking or chucking to transfer the articles 34 between the bucket 30 and the tray 32. An ID reader 22 is provided at a lower position of the hand 11 for reading data of an ID tag provided, e.g., at an upper position of the article 34. For this purpose, a suction surface or a chucking unit at a lower position of the hand 11 can move three-dimensionally in X, Y, and X directions in the frame 24 for transferring the article.

The transfer device 10 at the retrieval station 9 has the same structure, except that an ID reader-writer 23 (not shown) is provided at a lower end of the hand 12, instead of the ID reader 22. The types of the transfer device 10 and the hands 11 and 12 can be determined arbitrarily. For example, the kinematic axes such as three axes of the hands 11 and 12 are not limited to the X axis, the Y axis, and the Z axis. For example, the R axis, the θ axis, and the φ axis may be the kinematic axes. Further, both of the hands 11 and 12 may have the ID reader-writer.

A reference numeral 28 denotes a conveyor for connecting the long distance conveyor 16 and the stations 8 and 9. Reference numerals 29 denote a pair of lifters. At the time of transferring the bucket 30 to and from the stacker crane, the lifters 29 lift the buckets 30 above the transportation surface of the conveyor 28. Further, for example, the ID tag 37 of the bucket 30 is read by an ID reader provided at the elevation frame of the stacker crane. Alternatively, an ID reader-writer may be provided at the elevation frame of the stacker crane. Conversely, it is not essential to provide the ID reader or the like at the elevation frame. Further, the ID tag 37 of the bucket 30 may be read/written at the stations 8 and 9.

Figure 4:
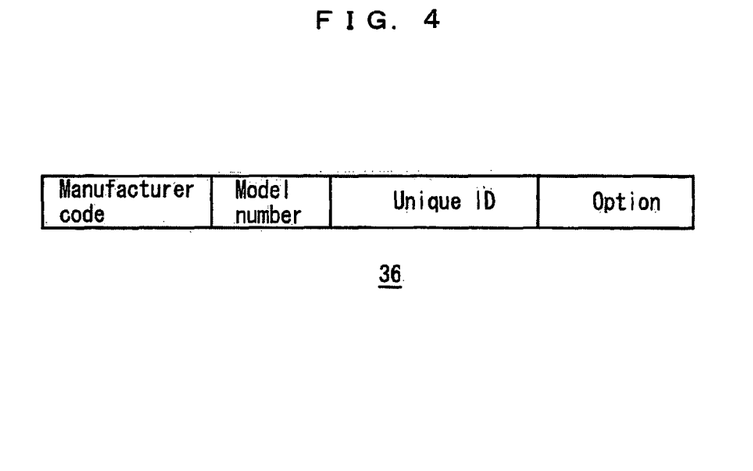
FIG. 4 is a diagram showing data structure of an ID tag used in the embodiment.

FIG. 4 shows data structure of an ID tag 36. A manufacturer of an article or the origin of production is written in a manufacturer code field, and a model number identifying the type of the articles within the range of manufacture codes is written in a model number field. Data identifying the article, i.e., a unique ID is written in a unique ID field. The unique ID is data identifying individual articles within the range of manufacturer codes and model numbers. Data for each of individual articles is written in an option field. For example, the best-before date, the next addressee, the next destination, the next production process, or the ID of the final product including the article, or the wholesale price is written in the option field. For example, the optional information is written at the time of retrieving the article from the warehouse in the retrieval station, or storing the article in the warehouse in the storage station. The optional information is data related to handling of the article after the article is retrieved from the warehouse, and the optional information is not the ID itself of the article.

Figure 5:
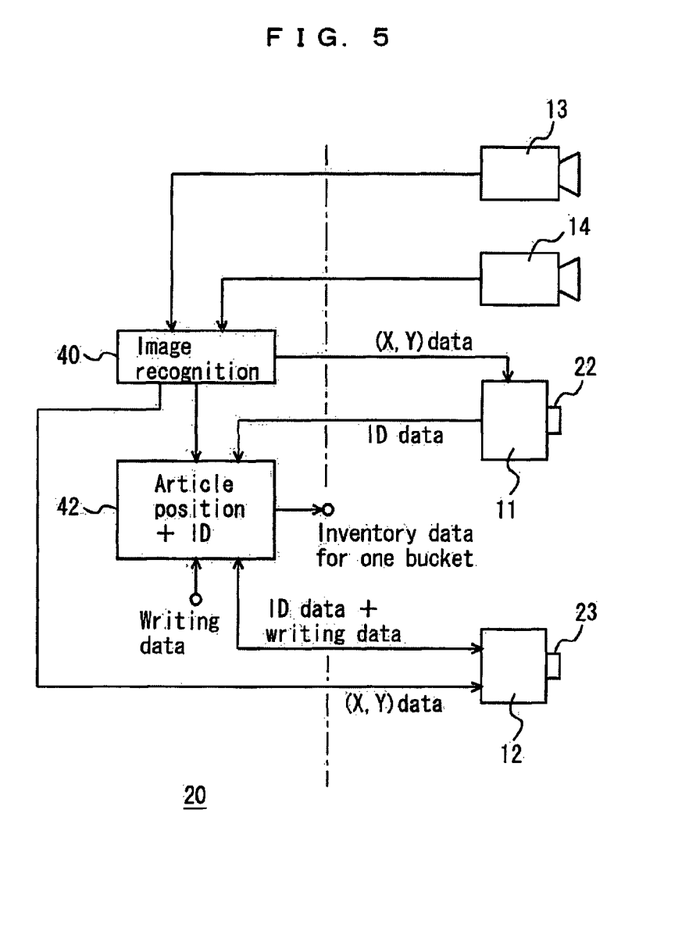
FIG. 5 is a block diagram showing a manner of processing data from a camera or an ID reader in the automatic warehouse according to the embodiment.

FIG. 5 shows the relationship between the computer 20 and the cameras 13, 14, and the relationship between the ID reader 22 and the ID reader-writer 23. The cameras 13, 14 take images of articles on the bucket, and an image recognition unit 40 recognizes positions of the articles for controlling operations of the hands 11, 12 in the XY directions. The ID reader 22 reads ID data of articles to be stored in the warehouse, and inputs data together with data of hands indicating the positions of articles in the bucket, to an article data calculation unit 42. As a result, data indicating the correspondence between the positions on the buckets and the IDs of the articles stored in the buckets is obtained. In this manner, inventory data for one bucket is obtained. At the time of retrieving articles from the warehouse, using position data for one bucket in the inventory data, or using data obtained by image recognition of the image data taken by the camera 14 by the image recognition unit 40, the hand 12 is operated to pick up the target articles one by one. Data of ID tags of the picked articles is read by the ID reader 23. The data of the ID tags is compared with the IDs of the articles that are scheduled to be retrieved from the warehouse for inspecting articles at the time of retrieval of articles. Further, if there is any data of the best-before date, the next destination, and the price for each of the articles, the ID reader-writer 23 writes such data in the ID tag of the article.

Figure 6:
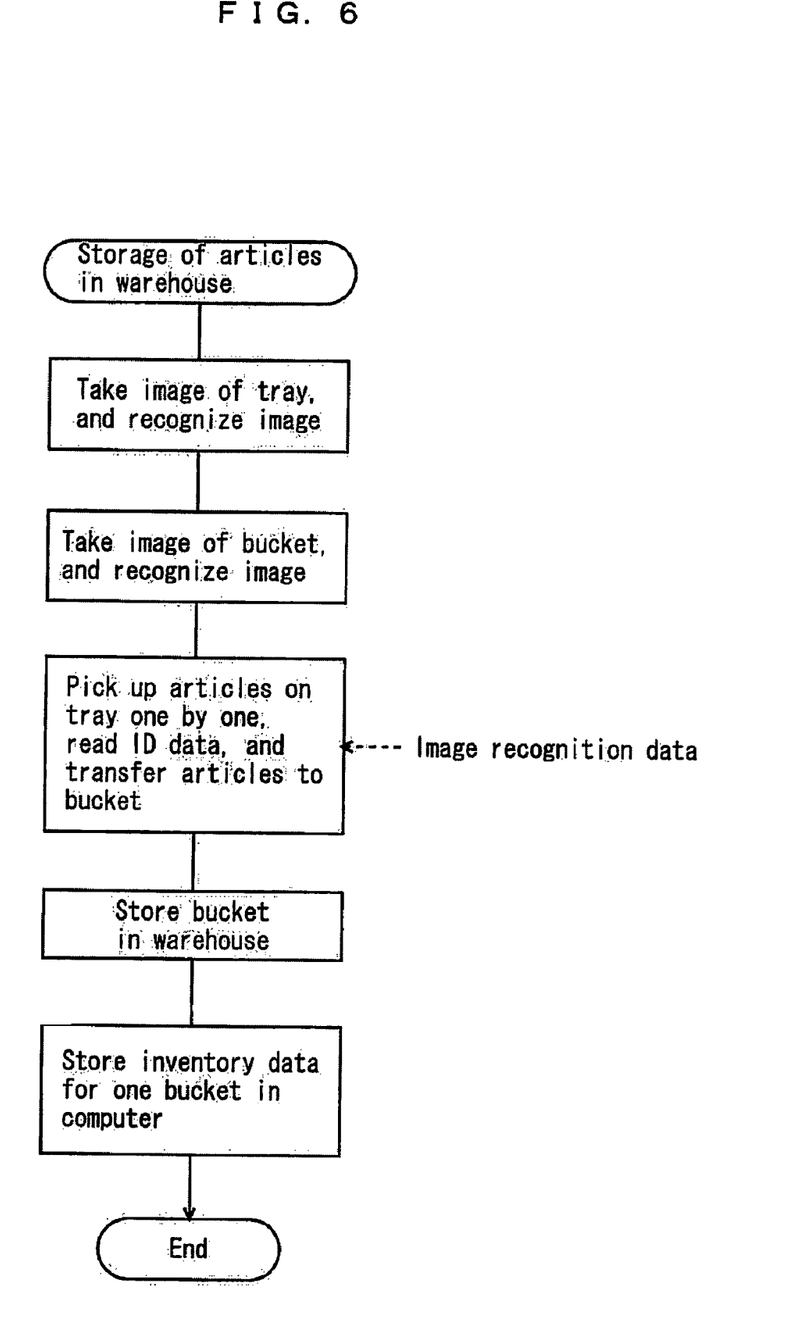
FIG. 6 is flow chart showing a processing algorism at the time of storing articles in the warehouse according to the embodiment.

FIG. 6 shows processes at the time of storage of articles. An image of the tray is taken, and image recognition of the image is performed. At this time, an image of the bucket is taken, and image recognition of the image of the bucket is performed to determine empty positions on the bucket, and determine positions for storing the articles. The articles on the tray are picked up one by one using the hand. Data of the ID tags are read ty the ID reader, and the articles are transferred to the bucket. Then, the bucket is stored in the warehouse. The ID reader at the elevation frame of the stacker crane reads data of the ID tag of the bucket or the like, and stores the bucket, e.g., in a rack address written in the ID tag. At this time, the inventory data for one bucket is stored in the computer.

Figure 7:
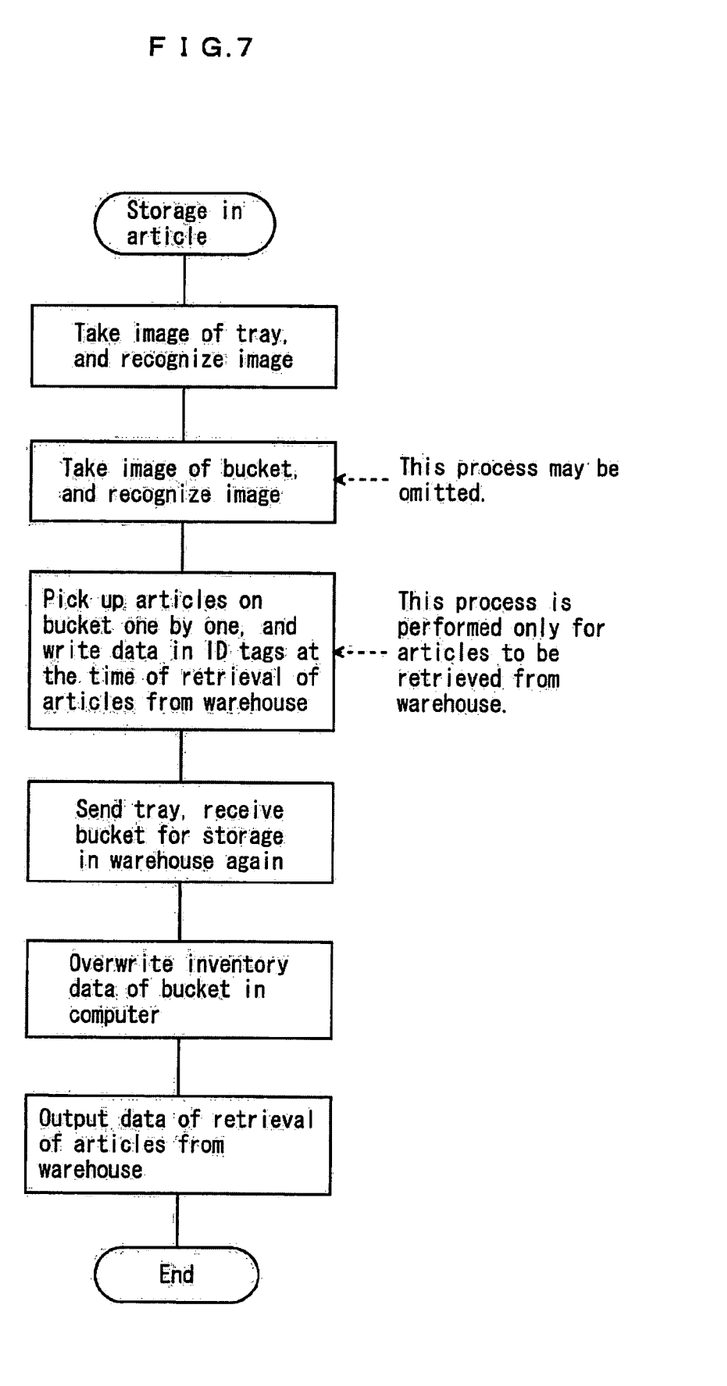
FIG. 7 is flow chart showing a processing algorism at the time of retrieving articles from the warehouse according to the embodiment.

FIG. 7 shows processes at the time of retrieving articles from the warehouse. A tray at the destination to which the articles are retrieved, is recognized. By image recognition, empty positions or the like are determined to determine positions for storing articles retrieved from the warehouse. Further, an image of the bucket is taken, and by image recognition, positions of the articles are determined. Instead of taking an image of the bucket, picking of the article may be carried out using the positions of the article in the inventory data, since the inventory data for one bucket determined at the time of storage of articles includes data of IDs and positions of the articles. The articles on the bucket is picked up one by one, and data at the time of retrieval of articles is written in the ID tag. In the case where only some of a plurality of articles in the bucket are retrieved from the warehouse, it is sufficient to write data of only the articles retrieved from the warehouse. The data written at the time of retrieval of articles from the warehouse is optional. If there is no such data, writing is not necessary. Then, the bucket is stored again in the warehouse, e.g., in a rack address written in the ID tag of the bucket. Further, a list of IDs of the articles retrieved from the warehouse is created at the time of reading IDs by the ID reader-writer. Inspection of articles at the time of retrieval of articles from the warehouse is performed, and inventory data in the bucket is overwritten. Then, the data of retrieval of articles from the warehouse is outputted, e.g., to an external computer or a terminal used for managing long distance conveyors or the like.

Although the embodiment has been described in connection with the case of the automatic warehouse in which the rack, the station, and the stacker crane are used in combination, the present invention is not limited in this respect. For example, the automatic warehouse may have racks which can be elevated/lowered, in a plurality of stages, and the articles on the rack can be transferred to and from the station when the rack is elevated/lowered to a predetermined height. In this case, at the station for transferring the carrier to and from the rack, in the same manner as in the case of the embodiment, the articles should be transferred one by one, and data of the ID tags should be written/read in the process of transferring the articles.

In the embodiment, the storage station 8 and the retrieval station 9 are shown separately. The storage station 8 and the retrieval station 9 may be the same stations each having, e.g., the ID reader-writer. Alternatively, a single station may be operated as both of the storage station and the retrieval station. Further, the cameras 13, 14 may be provided at the transfer device 10. For example, the cameras 13, 14 may be provided at the hands 11, 12 of the transfer device 10. Further, a plurality of automatic warehouses may be provided in parallel to form an automatic warehouse system, or the automatic warehouse may be combined with the rail vehicle system or the long distance conveyors to form the storage warehouse system.

In the embodiment, the following advantages are obtained.

(1) It is possible to obtain inventory data including positions and IDs of articles in the bucket.

(2) At the time of retrieving articles from a warehouse, it is possible to manage individual IDs of articles retrieved from a warehouse one by one.

(3) At the time of retrieving articles from a warehouse, it is possible to write data of individual articles one by one. Therefore, it is possible to finely manage distribution after retrieval of articles from the warehouse.

(4) It is possible to easily inspect articles at the time of storage of articles in the warehouse, and at the time of retrieval of articles from the warehouse.

(5) It is possible to read and write only data of the ID tag of the article held by the hand. Thus, ID tags of other articles are not written by confusion.

The invention claimed is:

1. An automatic warehouse, comprising:
a carrier which stores a plurality of articles;
a transfer device having a hand for holding and transferring an article to and from the carrier one by one;
an ID reader attached to the hand, the ID reader reading data from ID tags of the articles while the articles are transferred by the hand;
imaging means for taking an image of the articles and determining positions of the articles; and
a computer which stores positions of the articles in the carrier and data of the read ID tags,
wherein the hand of the transfer device is controlled in accordance with the positions of the articles determined by the imaging means.

2. The automatic warehouse according to claim 1, further comprising a tray on which the articles are placed,
wherein said carrier is a bucket, and
wherein the imaging means takes an image of the articles on the tray collectively to determine the positions of a plurality of articles.

3. The automatic warehouse according to claim 1, wherein the computer manages inventory of the automatic warehouse and controls the transfer device.

4. The automatic warehouse according to claim 1,
wherein the transfer device comprises a storage transfer device which stores articles and a retrieval transfer device which retrieves articles, and
wherein the retrieval transfer device comprises a hand and an ID reader-writer which reads data from the ID tags of the articles and writes data in the ID tags while the retrieval transfer device picks up the articles from the carrier, and
wherein the storage transfer device comprises the ID reader.

5. The automatic warehouse according to claim 4,
wherein the carrier is a bucket,
wherein the storage transfer device transfers the articles on a tray to the bucket one by one, and
wherein the retrieval transfer device transfers the articles from the bucket to the tray one by one.

6. A method of storing and retrieving articles from an automatic warehouse, comprising:
holding and transferring an article to and from a carrier one by one using a hand of a transfer device, the hand of the transfer device comprising an ID reader for reading data from ID tags of articles while holding and transferring the articles;
taking an image of the articles,
determining the positions of the articles based on the image of the articles, and
controlling the hand in accordance with the determined positions, storing the positions of the articles in the carrier and the data read from the ID tags; and reading data from ID tags of articles while picking up the articles from the carrier using the hand, in accordance with the positions of the articles in the carrier.

7. The method according to claim 6, further comprising:

transferring the articles from the carrier to a tray using the hand of the transfer device;

taking an image of the articles in the tray collectively; and controlling the hand in accordance with the determined positions of the articles in the tray, wherein the carrier is a bucket.

8. The method according to claim 6, wherein the transfer device comprises a storage transfer device and a retrieval transfer device, wherein the storage transfer device comprises the ID reader, and wherein the retrieval transfer device comprises an ID reader-writer for reading data from the ID tags of the articles and writing data in the ID tags at the time of retrieval of the articles while picking up the articles from the carrier.

* * * * *